US012687436B2

(12) United States Patent
Da Cunha et al.

(10) Patent No.: US 12,687,436 B2
(45) Date of Patent: Jul. 21, 2026

(54) HOLDER FOR COMPONENT OF TEMPERATURE SENSING SYSTEM

(71) Applicants: AIRBUS OPERATIONS LIMITED, Bristol (GB); Airbus Operations (SAS), Toulouse (FR)

(72) Inventors: Mauricio Pereira Da Cunha, Orono, ME (US); Robert J. Lad, Orono, ME (US); Ian White, Bristol (GB); Kurt Bruggemann, Bristol (GB); Richard Downing, Bristol (GB); Maud Consola, Bristol (GB)

(73) Assignees: Airbus Operations Limited, Bristol (GB); Airbus Operations (SAS), Toulouse (FR)

( * ) Notice: Subject to any disclaimer, the term of this patent is extended or adjusted under 35 U.S.C. 154(b) by 899 days.

(21) Appl. No.: 18/071,464

(22) Filed: Nov. 29, 2022

(65) Prior Publication Data

US 2023/0168130 A1     Jun. 1, 2023

Related U.S. Application Data

(60) Provisional application No. 63/284,479, filed on Nov. 30, 2021.

(51) Int. Cl.
*G01K 1/14*          (2021.01)
*B64C 25/42*        (2006.01)
(Continued)

(52) U.S. Cl.
CPC ............... *G01K 1/14* (2013.01); *B64C 25/42* (2013.01); *G01K 1/024* (2013.01); *G01K 11/265* (2013.01)

(58) Field of Classification Search
CPC ... F16D 2066/001; F16D 66/00; B64C 25/42; B64C 25/28; G01K 1/14; G01K 1/146; G01K 1/024; G01K 11/265
See application file for complete search history.

(56) References Cited

U.S. PATENT DOCUMENTS

| | | | | |
|---|---|---|---|---|
| 3,788,143 A | * | 1/1974 | Gabriel | ................. F01D 17/085 |
| | | | | 374/E13.006 |
| 4,241,603 A | | 12/1980 | Han et al. | |

(Continued)

FOREIGN PATENT DOCUMENTS

| | | |
|---|---|---|
| CN | 101625274 | 1/2010 |
| CN | 204760097 U | 11/2015 |

(Continued)

OTHER PUBLICATIONS

Behanan et al., "Thin Films and Techniques for SAW Sensor Operation above 1000° C.", 2013 IEEE International Ultrasonics Symposium (IUS), <https://doi.org/10.1109/ULTSYM.2013.0260>, pp. 1013-1016, Jul. 21-25, 2013.

(Continued)

*Primary Examiner* — Thomas W Irvin
(74) *Attorney, Agent, or Firm* — Nixon & Vanderhye, PC

(57)          ABSTRACT

A holder for a wireless relay device is disclosed including a rigid hollow arm member to be received in a groove in a torque tube spline of an aircraft wheel brake; and a support member to support the wireless relay device, the support member mechanically coupled to the rigid hollow arm member towards a first end of the rigid hollow arm member, wherein: the rigid hollow arm member provides a conduit for a communications cable to couple to the wireless relay device. Also disclosed is an aircraft wheel brake comprising the holder and an aircraft comprising the aircraft wheel brake.

12 Claims, 11 Drawing Sheets

(51) Int. Cl.
    *F16D 66/00*         (2006.01)
    *G01K 1/024*       (2021.01)
    *G01K 11/26*      (2006.01)

(56)           References Cited

U.S. PATENT DOCUMENTS

| | | | |
|---|---|---|---|
| 4,249,642 A | 2/1981 | Anderson et al. | |
| 4,569,600 A * | 2/1986 | Preniczny | G01J 5/0821 |
| | | | 188/1.11 R |
| 4,658,936 A | 4/1987 | Moseley | |
| 5,172,960 A | 12/1992 | Chareire | |
| 5,345,134 A | 9/1994 | Greer | |
| 5,392,716 A * | 2/1995 | Orschek | F16C 19/525 |
| | | | 105/49 |
| 5,446,452 A | 8/1995 | Litton | |
| 5,651,430 A | 7/1997 | Rancourt et al. | |
| 5,705,774 A | 1/1998 | Beauchamp | |
| 5,834,117 A | 11/1998 | Onishi | |
| 5,862,890 A * | 1/1999 | Long | F16D 55/36 |
| | | | 188/73.36 |
| 5,909,171 A | 6/1999 | Kyrtsos | |
| 6,431,824 B2 * | 8/2002 | Schotsch | F01D 9/02 |
| | | | 415/118 |
| 6,592,253 B2 * | 7/2003 | Nyffenegger | H01C 1/022 |
| | | | 374/185 |
| 6,696,937 B1 | 2/2004 | Kiefer | |
| 6,988,026 B2 | 1/2006 | Breed et al. | |
| 7,313,467 B2 | 12/2007 | Breed et al. | |
| 7,726,184 B2 | 6/2010 | Cook et al. | |
| 8,087,824 B2 * | 1/2012 | Bingham | G01K 1/14 |
| | | | 374/208 |
| 8,858,074 B2 * | 10/2014 | Greenberg | G01K 13/02 |
| | | | 374/208 |
| 9,267,561 B2 | 2/2016 | Conway | |
| 9,415,757 B2 | 8/2016 | Martinotto et al. | |
| 9,712,894 B2 | 7/2017 | Lee et al. | |
| 9,796,364 B2 | 10/2017 | King et al. | |
| 9,869,337 B2 | 1/2018 | Drexler | |
| 10,135,624 B2 | 11/2018 | Bill et al. | |
| 10,249,410 B1 | 4/2019 | Lanoe et al. | |
| 10,564,050 B2 | 2/2020 | Brüggemann et al. | |
| 10,591,395 B1 * | 3/2020 | Jamison | G01N 19/02 |
| 11,204,285 B2 | 12/2021 | Bruggemann et al. | |
| 2002/0062904 A1 | 5/2002 | Jeong et al. | |
| 2002/0078757 A1 | 6/2002 | Hines et al. | |
| 2002/0148690 A1 | 10/2002 | Wirth et al. | |
| 2002/0169231 A1 | 11/2002 | Okayama et al. | |
| 2003/0010582 A1 | 1/2003 | Denton et al. | |
| 2003/0067960 A1 * | 4/2003 | Nyffenegger | G01K 1/16 |
| | | | 374/185 |
| 2004/0011596 A1 | 1/2004 | Miller et al. | |
| 2004/0164140 A1 | 8/2004 | Voeller et al. | |
| 2004/0196888 A1 * | 10/2004 | Musbach | G01J 5/0893 |
| | | | 374/120 |
| 2004/0207059 A1 | 10/2004 | Hong | |
| 2004/0217670 A1 | 11/2004 | Ueda et al. | |
| 2005/0056098 A1 | 3/2005 | Solie | |
| 2005/0088045 A1 | 4/2005 | Fondriest | |
| 2005/0151599 A1 | 7/2005 | Ido et al. | |
| 2006/0025897 A1 | 2/2006 | Shostak et al. | |
| 2006/0152074 A1 | 7/2006 | Chico et al. | |
| 2006/0180371 A1 | 8/2006 | Breed et al. | |
| 2006/0226698 A1 | 10/2006 | Riebe et al. | |
| 2006/0238078 A1 | 10/2006 | Liu | |
| 2007/0139165 A1 | 6/2007 | Liu | |
| 2007/0177866 A1 | 8/2007 | Fujimoto | |
| 2007/0188054 A1 | 8/2007 | Hasken et al. | |
| 2008/0092641 A1 * | 4/2008 | Cahill | B60T 8/52 |
| | | | 73/121 |
| 2008/0265711 A1 | 10/2008 | Kumar et al. | |
| 2008/0278288 A1 | 11/2008 | Obrien | |
| 2009/0125286 A1 | 5/2009 | Waltz | |
| 2009/0165546 A1 | 7/2009 | Cook et al. | |
| 2009/0213899 A1 * | 8/2009 | Bingham | G01K 1/14 |
| | | | 374/E1.018 |

| | | | |
|---|---|---|---|
| 2009/0243895 A1 | 10/2009 | Mitchell et al. | |
| 2010/0117859 A1 | 5/2010 | Mitchell et al. | |
| 2010/0198472 A1 | 8/2010 | Kure et al. | |
| 2010/0207754 A1 | 8/2010 | Shostak et al. | |
| 2010/0250082 A1 | 9/2010 | King et al. | |
| 2011/0144879 A1 | 6/2011 | Miller et al. | |
| 2011/0241866 A1 | 10/2011 | Todd et al. | |
| 2011/0276223 A1 | 11/2011 | Gowan et al. | |
| 2011/0280279 A1 | 11/2011 | Gregory et al. | |
| 2012/0007607 A1 | 1/2012 | Lowe et al. | |
| 2012/0018524 A1 | 1/2012 | Loi et al. | |
| 2012/0296567 A1 | 11/2012 | Breed | |
| 2012/0318557 A1 | 12/2012 | Iwasaki et al. | |
| 2012/0326560 A1 | 12/2012 | Yun et al. | |
| 2013/0033381 A1 | 2/2013 | Breed | |
| 2013/0131891 A1 | 5/2013 | Gowan et al. | |
| 2013/0161058 A1 | 6/2013 | Camp, II et al. | |
| 2013/0230075 A1 | 9/2013 | Selles et al. | |
| 2014/0016670 A1 * | 1/2014 | Greenberg | G01K 1/14 |
| | | | 374/E7.004 |
| 2014/0018978 A1 | 1/2014 | Cahill et al. | |
| 2014/0060168 A1 | 3/2014 | Frank | |
| 2014/0103465 A1 | 4/2014 | Johnson et al. | |
| 2014/0198824 A1 | 7/2014 | Nagl et al. | |
| 2014/0311833 A1 | 10/2014 | Martinotto et al. | |
| 2015/0013461 A1 | 1/2015 | Pollard et al. | |
| 2015/0077630 A1 | 3/2015 | Miller | |
| 2015/0112515 A1 | 4/2015 | Conway | |
| 2015/0280686 A1 | 10/2015 | Robinson | |
| 2016/0090173 A1 | 3/2016 | Zabulon et al. | |
| 2016/0169261 A1 | 6/2016 | Peters et al. | |
| 2016/0236019 A1 | 8/2016 | Fyfe | |
| 2017/0138423 A1 | 5/2017 | Kirkpatrick | |
| 2017/0259942 A1 | 9/2017 | Ziarno | |
| 2017/0307036 A1 | 10/2017 | Nuesser et al. | |
| 2017/0363482 A1 | 12/2017 | Bruggemann et al. | |
| 2019/0057887 A1 | 2/2019 | Ballandras et al. | |
| 2019/0283728 A1 | 9/2019 | Jimenez et al. | |
| 2020/0041480 A1 | 2/2020 | Worden et al. | |
| 2020/0158580 A1 | 5/2020 | Bruggemann et al. | |
| 2020/0339083 A1 | 10/2020 | Bill | |
| 2021/0095711 A1 | 4/2021 | Pinney | |
| 2021/0098153 A1 | 4/2021 | Quadir | |
| 2021/0237907 A1 | 8/2021 | Franzini et al. | |
| 2022/0046337 A1 | 2/2022 | Hwang et al. | |
| 2023/0167867 A1 | 6/2023 | Da Cunha et al. | |
| 2023/0168132 A1 | 6/2023 | Da Cunha et al. | |
| 2023/0168133 A1 * | 6/2023 | Da Cunha | F16D 55/36 |
| | | | 374/117 |
| 2023/0168134 A1 | 6/2023 | Da Cunha et al. | |
| 2023/0287951 A1 | 9/2023 | Muniraju et al. | |
| 2024/0233982 A1 | 7/2024 | Nomura et al. | |

FOREIGN PATENT DOCUMENTS

| | | |
|---|---|---|
| CN | 205122774 | 3/2016 |
| CN | 106 338 347 A1 | 1/2017 |
| CN | 206114142 | 4/2017 |
| CN | 107 271 028 A | 10/2017 |
| CN | 208477997 U | 2/2019 |
| CN | 208655287 U | 3/2019 |
| CN | 109708774 | 5/2019 |
| CN | 110581106 A | 12/2019 |
| CN | 210039711 U | 2/2020 |
| CN | 111122185 A | 5/2020 |
| CN | 112179518 | 1/2021 |
| CN | 214 175 761 U | 9/2021 |
| CN | 214705527 U | 11/2021 |
| CN | 114061786 | 2/2022 |
| DE | 4 006 885 | 10/1990 |
| DE | 102 15 834 | 11/2003 |
| EP | 1 148 266 | 10/2001 |
| EP | 2 642 149 | 9/2013 |
| EP | 2 777 998 | 9/2014 |
| EP | 2788990 A1 | 10/2014 |
| EP | 2 933 619 | 10/2015 |
| EP | 2 980 550 | 2/2016 |
| EP | 3 255 399 | 12/2017 |
| EP | 3 255 399 A2 | 12/2017 |

(56)  References Cited

FOREIGN PATENT DOCUMENTS

| EP | 3 530 532 | | 8/2019 |
|----|-----------|---|--------|
| EP | 3 770 065 | A1 | 1/2021 |
| EP | 3 789 744 | A1 | 3/2021 |
| GB | 2 250 364 | | 6/1992 |
| JP | HO5-667 | | 1/1993 |
| JP | H09240468 | | 9/1997 |
| JP | 2010064816 | | 3/2010 |
| KR | 20150094861 | A | 8/2015 |
| KR | 10-2019-0025126 | | 3/2019 |
| WO | 2005/097524 | | 10/2005 |
| WO | 2007/005020 | | 1/2007 |
| WO | 2007/061831 | | 5/2007 |
| WO | 2013/086013 | A1 | 6/2013 |
| WO | 2018/030942 | A1 | 2/2018 |

OTHER PUBLICATIONS

Henriksen T. "Zago—Specialised in ceramic fasteners", available <https://www fastenerandfixing.com/application-technology/specialisedin-ceramicfasteners>, four pages, Jan. 30, 2019.

ND Industries Inc.—Vibra-Tite, "Hot-Lock Extreme High Temperature Threadlocker", Vibra-tite.com, [online], available from: <https://www.vibratite.com/threadlockers/high-strength-threadlockers/hot-lock-extremehigh-temperature-threadlocker/>, six pages, dated Apr. 28, 2022.

Pohl A., "A Review of Wireless SAW Sensors", IEEE transactions on ultrasonics, ferroelectrics, and frequency control, vol. 47, No. 2, pp. 317-332, Mar. 2000.

Zhou et al. "Novel Multilayer SAW Temperature Sensor for Ultra-High Temperature Environments", Micromachines, vol. 12 No. 6, 643, eight pages, May 31, 2021.

Zhgoon et al. "High Temperature SAW Resonator Sensors: Electrode Design Specifics", retrieved from the Internet on Mar. 8, 2023 <https://hal.univ-lorraine.fr/hal-01868419/document>, pp. 1-8, Dec. 31, 2017.

Canabal et al. "Multi-sensor wireless interrogation of SAW resonators at high temperatures", IEEE, International Ultrasonics Symposium Proceedings, pp. 265-268, Oct. 11, 2010.

Extended European Search Report for Application No. EP 22210154.5, 16 pages, dated Mar. 17, 2023.

Extended European Search Report for Application No. EP 22210158.6, 10 pages, dated Mar. 20, 2023.

Extended European Search Report for Application No. EP 22210129.7, 12 pages, dated Apr. 4, 2023.

Extended European Search Report for Application No. EP 22210451.5, 17 pages, dated Apr. 4, 2023.

Extended European Search Report for Application No. EP 22210145.3, 9 pages, dated May 4, 2023.

Extended European Search Report for Application No. EP 22210149.5, 16 pages, dated Apr. 18, 2023.

Extended European Search Report for Application No. EP 22210152.9, 8 pages, dated Apr. 25, 2023.

Notice of Allowability for U.S. Appl. No. 16/773,254, eight pages, dated Aug. 18, 2021.

Office Action for U.S. Appl. No. 18/071,437, 10 pages, dated Nov. 28, 2025.

Office Action for U.S. Appl. No. 18/071,506, 15 pages, dated Sep. 26, 2025.

* cited by examiner

HOLDER FOR COMPONENT OF TEMPERATURE SENSING SYSTEM

CROSS RELATED APPLICATION

This application claims priority to U.S. Provisional Patent Application Ser. No. 63/284,479, filed Nov. 30, 2021, the content of which is incorporated by reference in its entirety.

TECHNICAL FIELD

The present invention relates to sensing aircraft wheel brake temperature. More specifically, the present invention relates to a holder for holding a component of a temperature sensing system for an aircraft wheel brake.

BACKGROUND

When aircraft wheel brakes are applied to reduce the speed of an aircraft, the temperature of the aircraft wheel brakes rises. It can be advantageous to monitor the temperature of the aircraft wheel brakes to, for example, ensure that the brakes do not overheat. For example, temperature sensors such as thermocouples can be used to sense temperature.

SUMMARY

A first aspect of the present invention provides a holder for a wireless relay device, the holder comprising: a rigid hollow arm member to be received in a groove in a torque tube spline of an aircraft wheel brake; and a support member to support the wireless relay device, the support member mechanically coupled to the rigid hollow arm member towards a first end of the rigid hollow arm member, wherein: the rigid hollow arm member provides a conduit for a communications cable to couple to the wireless relay device.

Optionally, the rigid hollow arm member comprises an orifice towards the first end to permit the communications cable to the exit the rigid hollow arm member to couple to the wireless relay device.

Optionally, the rigid hollow arm member has a circular cross-section.

Optionally, the rigid hollow arm member is extendable.

Optionally, the support member is a relay frame to accommodate the wireless relay device.

Optionally, the holder according to the first aspect comprises a frame border to hold the wireless relay device in position within the relay frame.

Optionally, the longitudinal edges of the relay frame closest to the rigid hollow arm member are chamfered.

Optionally, the holder according to the second aspect comprises: the communications cable accommodated in the rigid hollow arm member; and the wireless relay device accommodated in the support member.

Optionally, the communications cable carries one or more wires for respective one or more redundant connections to the wireless relay device.

Optionally, the communications cable is coupled to the wireless relay device via a brazed connection.

Optionally, the holder comprises: a mounting structure towards a second end of the rigid hollow arm member, opposite to the first end, the mounting structure permitting attachment to a torque tube of the aircraft wheel brake.

According to a second aspect of the present invention, there is provided an aircraft wheel brake comprising the holder according to the first aspect installed on a torque tube of said aircraft wheel brake.

According to a third aspect of the present invention, there is provided an aircraft comprising the aircraft wheel brake according to the second aspect.

BRIEF DESCRIPTION OF THE DRAWINGS

Embodiments of the invention will now be described, by way of example only, with reference to the accompanying drawings, in which.

DETAILED DESCRIPTION

The following disclosure relates to a temperature sensing device for sensing aircraft wheel brake temperature.

Figure 1:
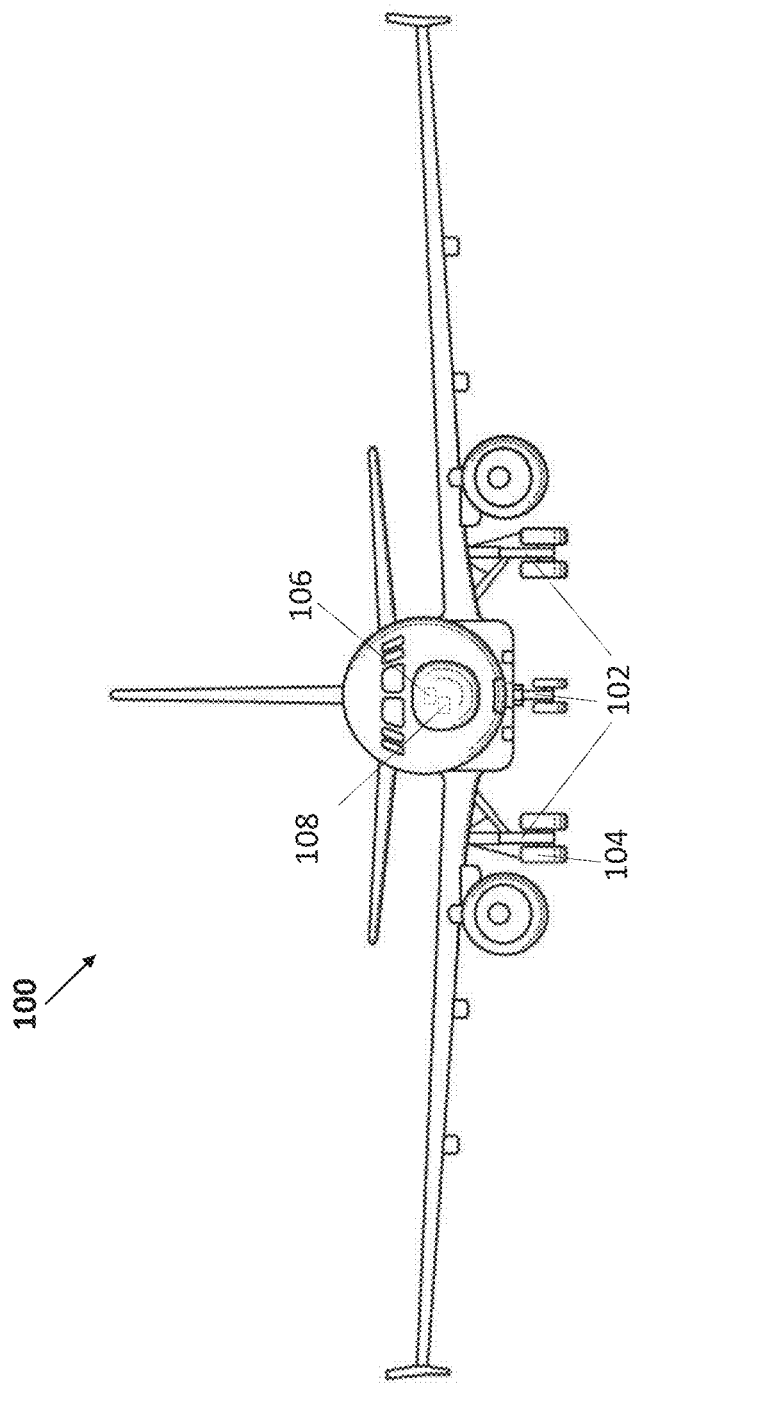
FIG. 1 is a simplified schematic view of an aircraft on which examples may be deployed.

FIG. 1 is a simplified schematic view of an aircraft 100. The aircraft 100 comprises a plurality of landing gear assemblies 102. The landing gear assemblies may include main and nose landing gears that are deployed or extended during take-off and landing. Each landing gear assembly 102 includes wheels 104. The aircraft 100 comprises a computing system 106, which, for example, comprises one or more processors and one or more computer readable storage media. The aircraft 100 may also comprise instruments 108, such as instruments or sensors for measuring characteristics or parameters related to the aircraft, and instruments or sensors for measuring environmental characteristics.

Figure 2:
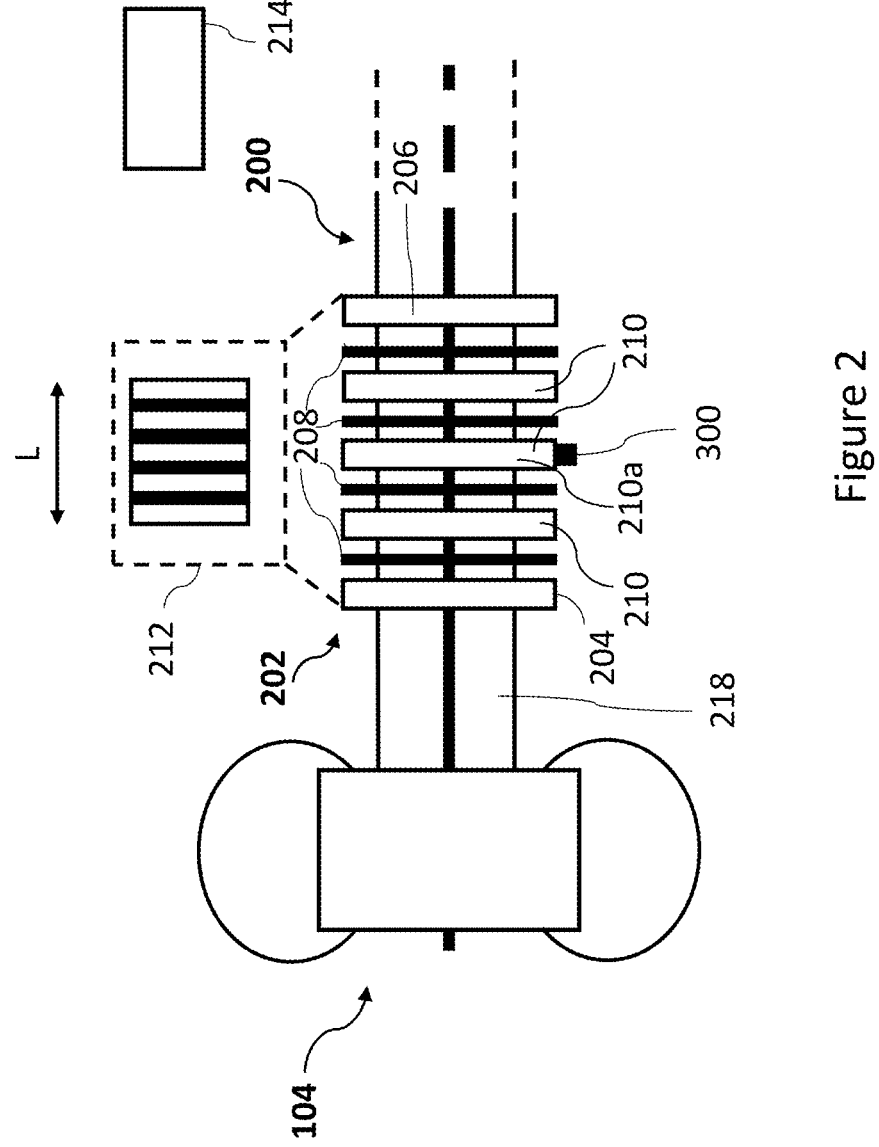
FIG. 2 is a simplified schematic view of a brake and a wheel of an aircraft landing gear assembly according to an example.

FIG. 2 is a simplified schematic view of an aircraft wheel brake 200 associated with the wheel 104 of the aircraft 100. The wheel brake 200 applies a braking force to inhibit the rotation of the wheel 104 when applied. Each of the wheels of the aircraft 100 may have a wheel brake 200 associated with it. In this example, the wheel brake 200 comprises a plurality of brake discs 202 including a pressure plate 204, a reaction plate 206, and a number of rotors 208 and stators 210. In this example, the brake discs 202 include a plurality of rotors and stators, and the wheel brake 200 is therefore a multiple disc brake. In other examples, the wheel brake 200 may not be a multiple-disc brake: there may be only one disc 208, for example, between a pressure plate 204 and a reaction plate 206. In some examples, the brake discs 202 may include up to 9 discs or 11 discs, or any other number which is suitable for a wheel brake of an aircraft. The brake discs 202 may collectively be referred to as a heat pack. The components of the wheel brake 200 (hereafter, for brevity, the wheel brake 200 is referred to simply as the brake 200) such as the brake discs 202 may be housed in a wheel brake housing (not shown). As referred to herein, the term brake is used as if to include such a wheel brake housing.

It will be understood that the type of wheel brake used in an aircraft landing gear depends on the characteristics of the aircraft in question, such as size, carrying capacity and the like. The following may be applied to any wheel brakes suitable for use as aircraft wheel brakes which heat up when applied to reduce aircraft speed, as discussed in the following.

When the aircraft 100 travels along the ground supported by the landing gear assembly 102, the rotors rotate with the wheel 104 (the rotors are keyed to the wheel 104), whereas the stators, the pressure plate 204 and the reaction plate 206 do not rotate with the wheel 104 (the stators, the pressure plate 204 and the reaction plate 206 are keyed to a torque tube 218 associated with the wheel 104 which does not rotate with the wheel 104). When braking is applied, the pressure plate 204 is urged towards the reaction plate 206 so that the brake discs 202 come into contact with one another (as shown in box 212 of FIG. 2) and friction acts to inhibit the rotational motion of the rotors, thus generating a braking force. When the brake 200 is applied, some of the kinetic energy of the aircraft 100 is absorbed into the brake discs 202 as heat (by the action of friction). Accordingly, the brake 200 heats up when it is applied to cause the aircraft 100 to slow down.

Any one or more of the rotors, stators, pressure plate 204 and the reaction plate 206 may be composed of Carbon-Carbon (CC) composites. A brake including brake discs composed of CC composites may be referred to as a carbon brake. For example, the brake discs 202 may be composed of a graphite matrix reinforced by carbon fibers.

Those skilled in the art will appreciate that the environment of the brake discs 202 may be harsh due to vibration and/or physical shock during application of braking for example. The environment of the brake discs 202 may be harsh due to high temperatures reached by the brake discs 202, for example.

In this example, the aircraft 100 comprises a braking system 214 which controls the operation of the brake 200. The braking system 214 causes the brake 200 to be applied in response to a braking request (for example when a pilot of the aircraft 100 presses a brake pedal). For example, the brake 200 may be hydraulically actuated in which case the braking system 214 includes a hydraulic system (not shown) operationally connected with the brake 200. In other examples, the brake 200 may be electrically actuated in which case the braking system 214 includes an electronic brake actuation system. The braking system 214 may be controlled by the computing system 106.

Figure 3:
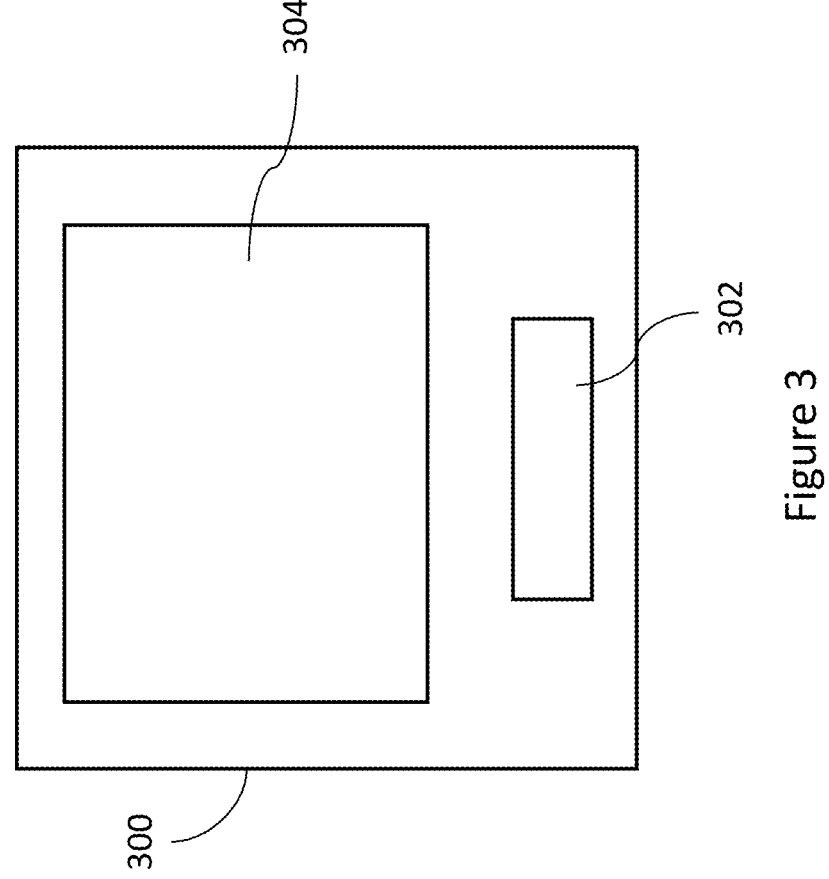
FIG. 3 is a simplified schematic block diagram of a temperature sensing device according to a first example.

FIG. 3 is a simplified schematic view of a temperature sensing device 300. The temperature sensing device 300 is for sensing aircraft wheel brake temperature (for example, the temperature of the brake 200). For example, the temperature sensing device 300 may be attached to a component of the brake in order to sense the temperature of that component of the brake 200. For example, the temperature sensing device 300 may be attached to one of the brake discs 202. In the example of FIG. 2, the temperature sensing device 300 is attached to one of the stators. For example, the temperature sensing device 300 is attached to a first stator 210a, as schematically shown.

The temperature sensing device 300 may be attached to the first stator 210a in a manner that can withstand the high temperatures expected to occur at the first stator 210a. For example, the temperature sensing device 300 may be attached to the first stator 210a by means of a ceramic adhesive. Ceramic adhesive may be intended to withstand high temperatures, for example in excess of 1000° C. For example, the ceramic adhesive may be applied between the first stator 210a and the temperature sensing device 300 and cured such that the temperature sensing device 300 is bonded to the first stator 210a using cured ceramic adhesive material (for example, ceramic epoxy adhesive material). In some examples, the first stator 210a comprises a first formation (for example, one or more grooves). The first formation may be formed by cutting, grinding, drilling, or boring the first formation into the material of the first stator 210a. In such examples, a second formation may be formed from the ceramic adhesive to interlock with the first formation. For example, the ceramic adhesive with the second formation may be an attachment element for attaching the temperature sensing device 300 to the first stator 210a. For example, the second formation is complementary to the first formation. For example, the first formation is a groove formed in the first stator 210a and the second formation is a spike which fits into the groove to inhibit movement between the first stator 210a the attachment element along an axial direction and a circumferential direction of the first stator 210a. In some examples, providing the attachment element as described comprises applying uncured ceramic adhesive material to the surface of the first formation to create the second formation.

It will be appreciated that the temperature sensing device 300 may be attached to a brake disc in a number of ways. Alternatively, or in addition to the use of ceramic adhesive, other fasteners such as ceramic bolts may be used to attach the temperature sensing device 300. For example, a ceramic bolt may be passed through a through hole in the temperature sensing device 300 and engage with a threaded hole in the first stator 210a. In some examples, an appropriately shaped clip (for example, a metal clip) may be used as an attachment element. For example, the clip may comprise through holes and may be attached to the first stator 210a using bolts. Those skilled in the art will appreciate the various ways of attaching components to withstand high temperatures.

The temperature sensing device 300 comprises a surface acoustic wave (SAW) sensor element 302. In the example of FIG. 3, the temperature sensing device also comprises a sensor antenna 304, which is electrically coupled to the SAW sensor element 302. The temperature sensing device 300 may be a passive device in that it does not require electrical power to operate. It will be understood that the SAW sensor element 302 works based on SAWs generated in the SAW sensor element 302. For example, the SAW sensor element 302 comprises a transducer which converts an input signal (for example, an electrical signal) into a surface acoustic wave that resonates in the SAW sensor element 302. The SAW sensor element 302 also, for example, comprises a transducer to convert the SAW into an output signal (for example, an output signal).

The temperature sensing device 300 may be configured to withstand the harsh environment of the brake discs 202. For example, the temperature sensing device may be configured to withstand at least one of: a saw tooth shock profile of 6 g at 20 ms duration, a saw tooth shock profile of 55 g at 30 ms duration, a saw tooth shock profile of 70 g at 0.4 ms duration, a half-sine shock profile of 40 g at 30 ms duration, a half-sine shock profile of 50 g at 0.5 ms duration, and vibration of 50 g at 2 kHz for a minimum duration of 3 hours. Vibrations and/or shock testing may be performed in accordance with Radio Technical Commission for Aeronautics (RTCA) DO-160G.

It will be understood that the SAW sensor element 302 works based on SAWs generated in the SAW sensor element 302. For example, the SAW sensor element 302 comprises a transducer which converts an input signal (for example, an electrical signal) into a surface acoustic wave that resonates in the SAW sensor element 302. The SAW sensor element 302 also, for example, comprises a transducer to convert the SAW into an output signal (for example, an output signal). Physical properties (such as temperature, for example) of the SAW sensor element may be determined based on the output signal.

The input signal may be referred to as an interrogation signal. That is because the interrogation signal causes the output signal based on which, for example, temperature can be determined. The interrogation signal therefore acts to query the SAW sensor element 302 to provide an output signal. The interrogation signal may be wirelessly received by the temperature sensing device 300. The output signal may be wirelessly transmitted by the temperature sensing device 300.

The SAW sensor element 302 comprises one or more interdigital transducers (IDTs). The IDTs are for converting between a SAW and, for example, an electrical signal. The functioning of an IDT is described further below. In some examples, the SAW sensor element 302 is a one-port SAW sensor. In such examples, the SAW sensor element 302 has one IDT. For example, the SAW sensor element 302 may have one IDT and reflectors either side of the IDT to reflect the SAW. In such examples, the one IDT converts an input signal into a SAW and also converts the SAW back into an electrical signal as a response (output) signal.

In some examples, the SAW sensor element 302 is a two-port SAW sensor. In such examples, the SAW sensor element 302 comprises two IDTs spaced apart from one another. There is an input IDT which converts an input signal into a SAW. The SAW travels from the input IDT to an output IDT. The output IDT converts the SAW into an output signal. Those skilled in the art will appreciate the various configurations of a SAW sensor element.

Figure 4:
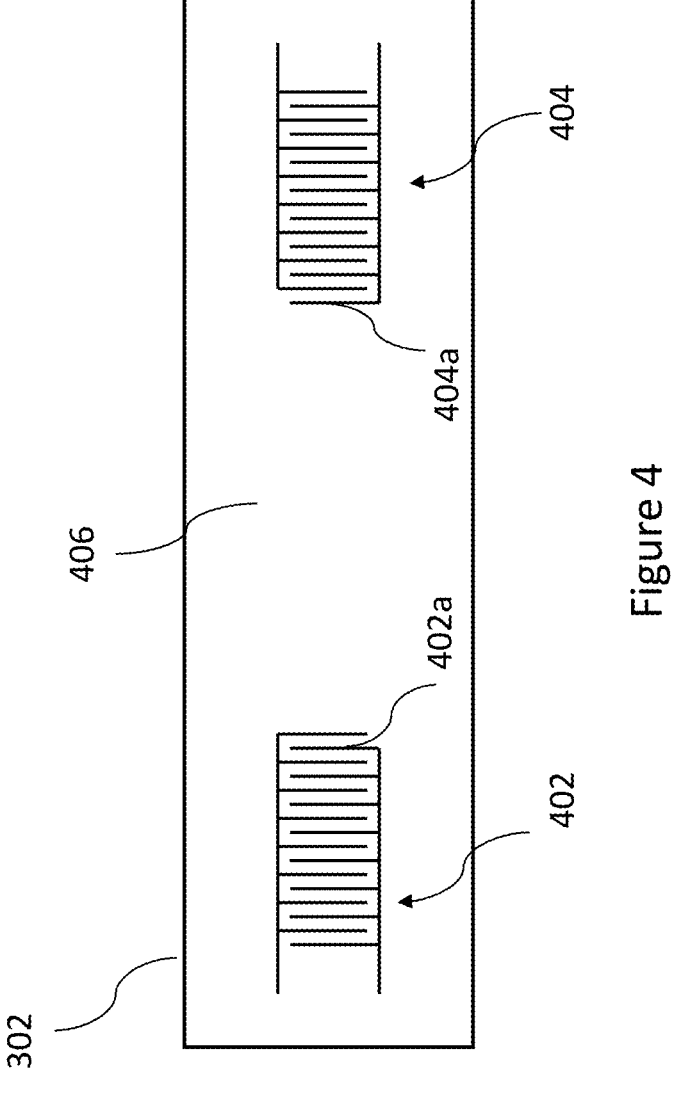
FIG. 4 is a simplified schematic plan view of a surface acoustic wave sensor element, according to an example.

FIG. 4 illustrates a particular example of the SAW sensor element 302. In this example, the SAW sensor element 302 is a two-port SAW sensor, and comprises an input IDT 402 and an output IDT 404. Each of the input IDT 420 and the output IDT 404 comprises two interlocking comb-shaped arrays of electrodes, deposited on the surface of a piezoelectric substrate 406 to form a periodic structure. The electrodes may be metallic electrodes, for example. In this example, the input IDT 402 comprises a first periodic electrode structure 402a and the output IDT 404 comprises a second periodic electrode structure 404a. The input IDT 402 is provided at a first location of the piezoelectric substrate 406 and the output IDT 404 is provided at a second location of the piezoelectric substrate 406 such that there is a space between the input IDT 402 and the output IDT 404.

Those skilled in the art will appreciate that a piezoelectric material can generate an electric charge in response to mechanical stress. Furthermore, a piezoelectric material can deform and generate mechanical stress in response to an applied electric field. An alternating electrical signal can be applied to the input IDT 402 such that adjacent electrodes have opposite polarities and the polarity of each electrode alternates according to the applied alternating electrical signal. Such a signal causes there to be a region of compressive stress next to a region of tensile stress, and each region alternates between compressive and tensile stress. As a result of this alternating compressive and tensile stress, there is generated a mechanical wave. This mechanical wave is what is referred to as a surface acoustic wave (SAW), as described above. SAWs in the SAW sensor element 302 are generated at the resonant frequency of the SAW sensor element 302.

In the example of FIG. 4, the SAW travels from the input IDT 402 to the output IDT 404. The alternating regions of compressive and tensile stress caused by the SAW at the output IDT cause there to be alternating electric fields. These alternating electric fields generate an electrical signal in the output IDT such that the polarities of adjacent electrodes of the output IDT 404 alternate in the manner described above for the input IDT 402. In other words, an electrical signal is generated at the output IDT 404 by the reverse of the process which took place at the input IDT 402 to generate the SAW from the input electrical signal.

As previously described, the physical properties (such as temperature, for example) of the SAW sensor element may be determined based on the output signal. The characteristics of the SAW in the SAW sensor element 302 depend on the physical properties of the SAW sensor element such as temperature. Therefore, by detecting the characteristics of the SAW, the temperature of the SAW sensor element 302 can be determined. For example, the characteristics of the SAW are detected using the output signal generated by the output IDT 404 in response to an interrogation signal received at the input IDT 402.

Various characteristics of the SAW may be detected. For example, a delay relating to the transmission of the interrogation signal and receipt of the output signal in response from the temperature sensing device 300, a phase shift response of the SAW sensor element 302, and/or a resonant frequency of the SAW sensor element 302 may be detected. For example, the frequency of the output signal corresponds to the frequency of the SAW and therefore the resonant frequency of the SAW sensor element 302. A desired physical property of the SAW sensor element 302 (such as temperature) may then be determined from the detected characteristic of the SAW sensor element 302.

A predefined relationship between the detected characteristic (for example, the resonant frequency) of the SAW sensor element 302 and the temperature of the SAW sensor element 302 may be stored in a computer readable memory (for example, in the computing system 106) on the aircraft 100, for example. The predefined relationship specifies what the detected characteristic of the SAW sensor element 302 is expected to be at various different temperatures (for example, obtained from calibration and/or testing of the SAW sensor element 302). For example, from a given resonant frequency, the temperature of the SAW sensor element 302 is determined from the predefined relationship. The predefined relationship may be stored in the form of a look-up table, rule, correlation equation, graph, etc.

The predefined relationship may be determined by performing calibration or other test on the SAW sensor element 302. For example, test may be performed to cause the SAW sensor element 302 to resonate at different temperatures and determine the resonant frequencies at those temperature in order to establish the predefined relationship.

As previously described, the temperature sensing device 300 is attached to one of the brake discs 202. In the example of FIG. 2, the temperature sensing device is attached to one of the stators 210. Therefore, the temperature of the SAW sensor element 302 corresponds to the temperature of the brake disc to which it is attached.

The interrogation signal may be wirelessly received by the temperature sensing device 300. The temperature sensing device 300 may comprise (as in the example of FIG. 3) a sensor antenna 304 configured to wirelessly receive the interrogation signal, and supply the interrogation signal to the SAW sensor element 302. For example, the sensor antenna 304 receives the interrogation signal in the form of radio waves and converts the radio waves into an electrical signal. The SAW sensor element may be configured to, responsive to the interrogation signal, output a signal as a response (the described output signal), the output signal indicative of the resonant frequency of the SAW sensor element 302, to the sensor antenna 304. For example, the sensor antenna 304 may be configured to wirelessly transmit the output signal. For example, the sensor antenna 304 converts the electrical output signal into radio waves.

For example, the sensor antenna 304 supplies the interrogation signal to the input IDT 402 of the SAW sensor element 302. The interrogation signal as received at the input IDT 402 is an alternating electrical signal which causes the input IDT 402 to generate a SAW as previously described. The SAW sensor element 302 provides an output signal (generated by the output IDT 404 as previously described). For example, the output signal is supplied from the output IDT 404 to the sensor antenna 304. The sensor antenna 304 transmits the output signal. For example, the sensor antenna 304 is electrically coupled to the input IDT 402 and the output IDT 404. The origin of the interrogation signal and the components which receive and process the output signal are described later.

A change in temperature of the SAW sensor element 302 causes a change in the resonant frequency. For example, as the temperature of the SAW sensor element 302 increases, the resonant frequency of the SAW sensor element decreases. The frequency of the SAW depends on the spacing between the electrodes of the IDTs. The spacing between adjacent electrodes is referred to as the pitch of the IDT in question. The pitch determines the wavelength of the SAW generated by the IDT. The pitch is equal to half of the wavelength of the SAW generated by the IDT. Therefore, the desired frequency resonant frequency of the SAW sensor element The frequency of the SAW depends on the propagation velocity of the SAW and the wavelength of the SAW according to Equation (1) below.

$$f = \frac{V_s}{\lambda} \tag{1}$$

In Equation (1), $f$ represents the frequency of the SAW, $V_s$ represents the propagation velocity of the SAW in the SAW sensor element in question, and $\lambda$ represents the wavelength of the SAW.

The frequency of the SAWs generated in the SAW sensor element 302 can be referred to as the resonant frequency of the SAW sensor element. It will be appreciated that, for a given propagation velocity of the SAW in the SAW sensor element 302, the resonant frequency of the SAW sensor element 302 can be configured by selecting an appropriate pitch for the IDTs of the SAW sensor element 302.

The temperature of the SAW sensor element 302 may be determined by detecting the resonant frequency of the SAW sensor element 302 as indicated by the output signal.

Figure 5:
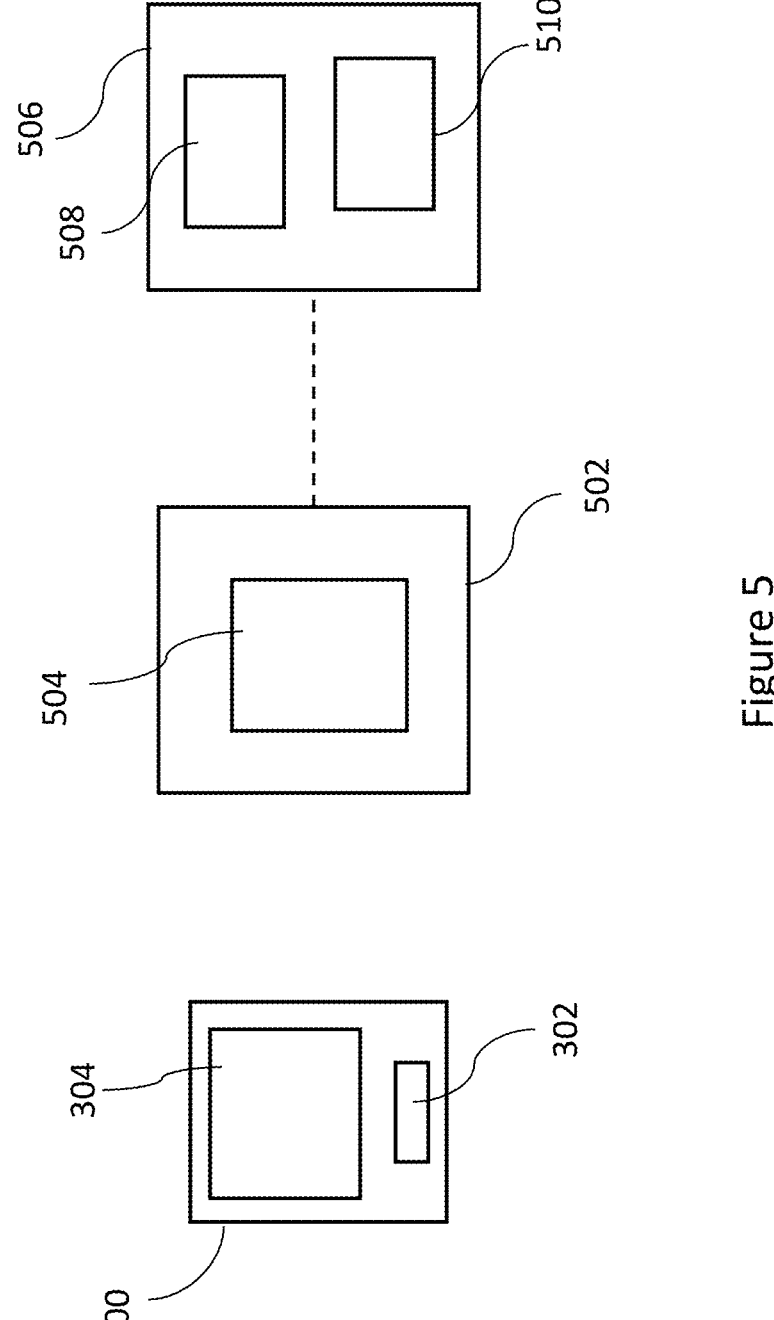
FIG. 5 is a simplified schematic block diagram of a temperature sensing system according to an example.

FIG. 5 schematically illustrates an example of a temperature sensing system 500 for sensing aircraft wheel brake temperature. The temperature sensing system 500 comprises the temperature sensing device 300 according to any of the described examples. The temperature sensing system 500 also comprises a wireless relay device 502 for delivering the interrogation signal for wirelessly interrogating the SAW sensor element 302. The wireless relay device 502 delivers the interrogation signal by wirelessly transmitting the interrogation signal to the temperature sensing device 300. The wireless relay device 502 also wirelessly receives the described output signal. The wireless relay device 502 is hereafter simply referred to as the relay 502.

In some examples, the relay 502 comprises a relay antenna 504. In some such examples, the relay 502 is simply a device for communicating wirelessly with the temperature sensing device 300. As described, the temperature sensing device 300 may be attached to one of the brake discs 202. The relay 502 may be attached to a component of the brake 200 or wheel 104 such that it can wirelessly communicate with the temperature sensing device 300 attached to a brake disc. For example, the relay 502 may be mounted so as to maintain line of sight with the temperature sensing device 300.

The wireless communication between the temperature sensing device 300 and the relay 502 can be implemented, for example, by electromagnetic, inductive or capacitive coupling of the relay 502 to the temperature sensing device 300. For example, each of the sensor antenna 304 and the relay antenna 504 may be configured to convert electrical signals to radio waves and vice versa, with the radio waves being transmitted between the respective antennas.

In some examples, the temperature sensing device 300 is attached to the first stator 210a and the relay 502 is attached to the torque tube 218 to which the first stator 210a is keyed. In such examples, the relay 502 is attached to the torque tube at a position so as to be in the line of sight of the temperature sensing device 300 on the first stator 210a. In other examples, the temperature sensing device 300 may be attached to a different brake disc or a different component of the brake 200, and the relay 502 may be attached to an appropriate location to maintain line of sight with the temperature sensing device 300.

The temperature sensing system 500 may comprise an interrogation apparatus 506. The interrogation apparatus 506 may form part of the computing system 106 of the aircraft 100. In such examples, the interrogation apparatus 506 forms a communication link (which may be wireless or wired) with the relay 502. The interrogation apparatus 506 comprises a controller 508 configured to provide the interrogation signal. For example, the controller 508 may provide the interrogation signal based on a command signal received from another component of the computing system 106. The command signal may comprise the interrogation signal, and the interrogation signal may simply be retransmitted towards to the relay 502. In other examples, the command signal may be an instruction for the controller 508 to generate the interrogation signal.

In the example of FIG. 5, the interrogation apparatus 506 comprises a transceiver 510 for transmitting the interrogation signal to the relay 502 and receiving the described output signal from the relay 502. The transceiver 510 may communicate with the relay 502 via a wired communication link or wirelessly. For example, for wireless communication, respective antennas may be provided as part of the relay 502 and the interrogation apparatus 506.

The SAW sensor element 302 has a resonant frequency within a frequency range between 175 megahertz (MHz) and 190 MHz at a predetermined temperature. A frequency range between 175 MHz and 190 MHz is not limited to a range having 175 MHz as a lower limit and 190 MHz as an upper limit. For example, the frequency range may be any range that falls between 175 MHz and 190 MHz (for example, 175 MHz to 180 MHz, 176 MHz to 188 MHz, 180 MHz to 190 MHz, etc.). In some examples, the resonant frequency of the SAW sensor element 302 is within the frequency range when the temperature of the SAW sensor element 302 is within a predetermined temperature range (for example, 24° C. to 1000° C.).

As previously described, the relay 502 is attached to the torque tube 218. In such examples, the relay 502 is attached to the torque tube 218 at a position so as to be in the line of sight of the temperature sensing device 300 on the first stator 210*a*, for example. The relay 502 may be attached to the torque tube 218 or otherwise mounted to the torque tube 218.

In some examples, there is provided a holder for a wireless relay device. For example, the holder is for the described relay 502. The holder comprises a rigid hollow arm member to be received in a groove in a torque tube spline of an aircraft wheel brake. The holder comprises a support member to support the relay. For example, the support member is mechanically coupled to the rigid hollow arm member towards a first end of the rigid hollow arm member. As referred to herein, mechanically coupled means that the support member is physically supported by (for example by being physically connected or mounted to) the rigid hollow arm member. For example, the support member is a housing, casing, frame or the like which receives and accommodates the relay. In some examples, the support member is a relay frame to accommodate the relay. For examples, the relay frame encases the relay while leaving a part of the relay exposed. For example, the part of the relay corresponding to the position of the relay antenna 504 may be exposed. The following description is in the context of the support member being a relay frame, as described.

As will be described in more detail below, in examples, the holder is for supporting a wireless relay device during operation of the aircraft wheel brake. The operational environment of the aircraft wheel brake may be harsh due to vibration and/or physical shocks generated during braking. Therefore, the holder may be configured to support the relay 502 when subjected to at least one of: a sawtooth shock profile of 6 g at 20 ms duration, a sawtooth shock profile of 50 g at 9 ms duration, a half-sine shock profile of 50 g at 0.5 ms duration, and vibration of 50 g at 2 kHz. Vibrations and/or shock testing may be performed in accordance with Radio Technical Commission for Aeronautics (RTCA) DO-160G.

In examples, the rigid hollow arm member provides a conduit for a communications cable to couple to the relay. For example, the rigid hollow arm member is hollow to accommodate the communications cable for carrying a signal to the relay. The communications cable is hereafter simply referred to as the cable. For example, the cable may carry the interrogation signal to the relay for wireless transmission towards the temperature sensing device. For example, the relay may wirelessly receive the output signal and the cable may carry the output signal from the relay to another component (for example, the interrogation apparatus 506 and the like). For example, the cable connects the relay 502 to the interrogation apparatus 506. The rigid hollow arm member is, for example, an elongate member of the holder which positions relay frame at a position along the torque tube 218 appropriate for wireless communication with the temperature sensing device mounted on one of the brake discs 202. For brevity, the rigid hollow arm member is hereafter referred to as the rigid hollow arm.

Figures 6A, 6B:
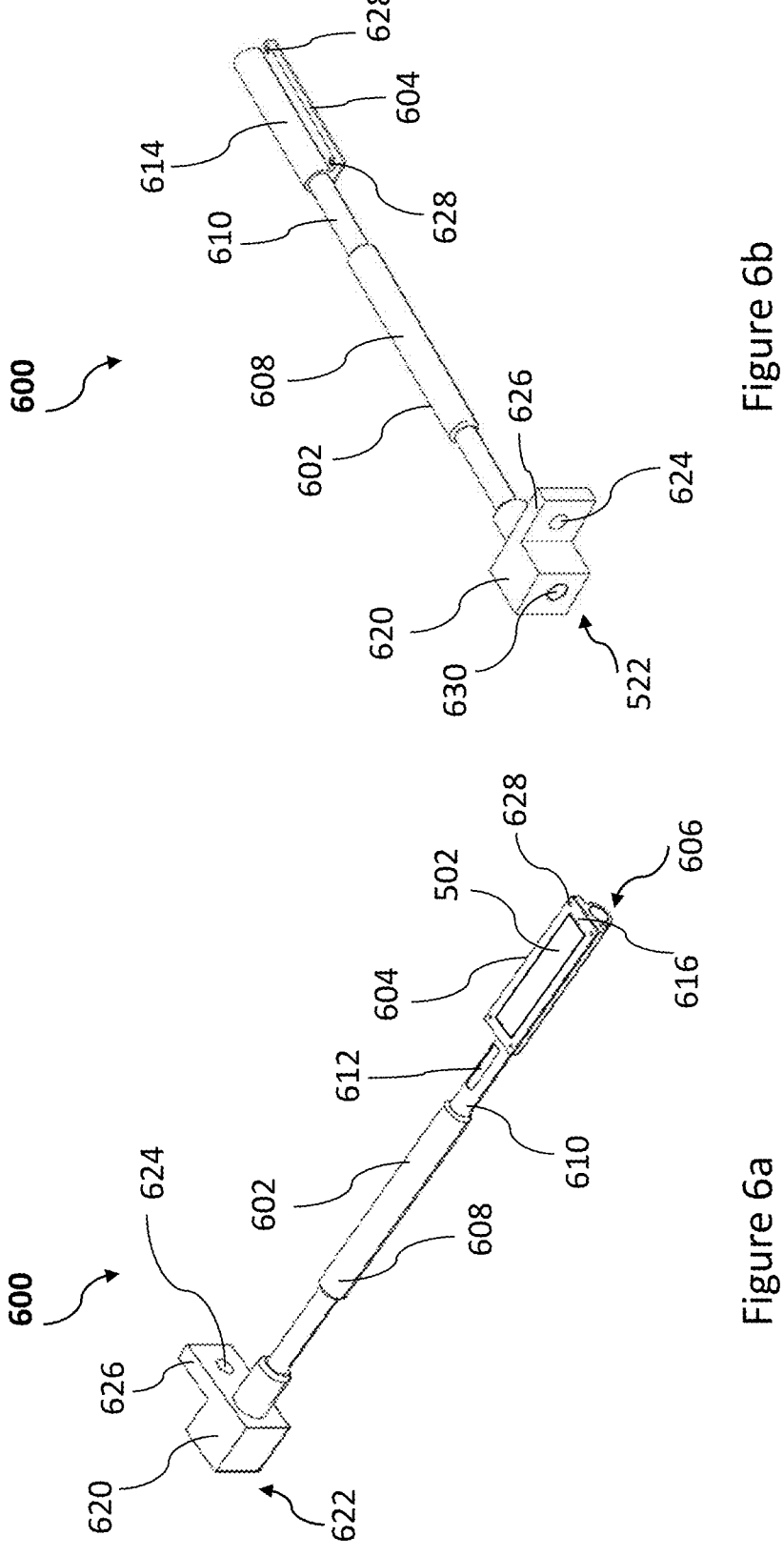
FIG. 6a is a first simplified schematic perspective view of a holder for a relay, according to a first example.
FIG. 6b is a second simplified schematic perspective view of the holder for the relay according to the first example.

FIG. 6*a* is a first simplified schematic perspective view of a first holder 600, according to an example. FIG. 6*b* is a second simplified schematic perspective view of the first holder 600 from a different angle to FIG. 6*a*. The first holder 600 comprises a rigid hollow arm 602 as previously described. The rigid hollow arm 602 holds its shape and is not flexible or configured to bend, for example. The rigid hollow arm 602 is rigid by virtue of being constructed from a strong material such as stainless steel, for example. For example, portions of the rigid hollow arm 602 are constructed from stainless steel and assembled. For example, by virtue of being hollow, the rigid hollow arm 602 can accommodate a cable. The rigid hollow arm 602 is to be received in a groove in a torque tube spline of for example, the brake 200. For example, the rigid hollow arm 602 has cross-sectional dimensions allowing it to be received in the groove of the torque tube spline. For example, the rigid hollow arm 602 may have a maximum width of no greater than 20 mm, and/or a maximum height of no greater than 20 mm. In examples, to be received in the groove in the torque tube spline, the rigid hollow arm 602 may have a maximum length of no greater than 300 mm. The first holder 600 comprises a first relay frame 604 as described. The first relay frame 604 is mechanically coupled to the rigid hollow arm 602 towards a first end 606 of the rigid hollow arm 602. The first relay frame 604 is supports the relay 502 by accommodating the relay 502 therein. For example, the relay 502 is housed within the first relay frame 604 in use.

The rigid hollow arm 602 may have a circular cross section. In some examples, the rigid hollow arm 602 comprises different cylindrical sections. However, in some examples, the rigid hollow arm 602 does not comprise different sections. In such examples, the rigid hollow arm 602 is a single rigid cylindrical part of the holder.

In the examples of FIGS. 6*a* and 6*b*, the rigid hollow arm 602 comprises a first arm section 608 and a second arm section 610, both with a circular cross section. Accordingly, the first and second sections 608, 610 are cylindrical sections. The second arm section 610 has a smaller cross-sectional diameter than the first arm section 608.

In some examples, the rigid hollow arm 602 is extendable. For example, the rigid hollow arm 602 may be extendable to various lengths in order to position the relay 502 differently with respect to a component (for example, the torque tube 218) to which the first holder 600 is mounted, as described later. In some examples, the rigid hollow arm 602 comprising different cylindrical sections may provide for an extendable arm. In such examples, the rigid hollow arm 602 is extendable by virtue of being telescopic. For example, the cylindrical sections may be configured to slide into one another in order to change the overall length of the rigid hollow arm 602. In some examples, the rigid hollow arm 602 may comprise one or more locking mechanisms which lock the cylindrical sections together to achieve particular lengths of the rigid hollow arm 602. For example, a cylindrical section with a smaller cross-sectional diameter may slide into a cylindrical section with a larger cross-sectional diameter.

In some examples, the rigid hollow arm 602 comprises an orifice 612 towards the first end 606 to permit the cable to exit the rigid hollow arm 602 to couple to the relay 502. In some examples, the orifice 612 is a cut out 612 in one of the cylindrical section of the rigid hollow arm 602. The cut out 612 may be adjacent to the first relay frame 604 for the cable (not shown in FIGS. 6a and 6b) to exit the rigid hollow arm 602 and connect to the relay 502 received in the first relay frame 604.

In the examples shown in FIGS. 6a and 6b, the first relay frame 604 comprises a cylindrical section 614 which slides onto the second arm section 610 and is secured in place. It will be appreciated that various ways of securing the cylindrical sections together may be used, for example, depressible buttons and corresponding holes, latches, complementary grooves, structures tightened using screws and/or bolts and the like.

The first relay frame 604 is an example of the described support member shaped appropriately for the relay 502. In some examples, the first relay frame comprises metal. In some examples, the first relay frame has an open portion where the relay 502 housed in the first relay frame 604 is exposed as shown in FIG. 6a. For example, the first relay frame 604 has a first frame border 616 which functions to hold the relay 502 in position within the first relay frame 604. For example, when installed in the first relay frame 604, there is a side of the relay 502 which is mostly exposed. The first frame border 616 is in contact with the boundaries of that side of the relay 502 to hold the relay 502 in place. In some examples, the first frame border 616 is metallic.

In the examples of FIGS. 6a and 6b, the first holder 600 comprises a first mounting structure 620. The first mounting structure 620 is provided towards a second end 622 of the rigid hollow arm 602 which is opposite to the first end 606. The mounting structure permits attachment to the torque tube 218. For example, the first mounting structure 620 may comprise means of receiving fasteners such as screws, bolts and the like in order that the first mounting structure 620 can be attached to the torque tube 218.

In the examples of FIGS. 6a and 6b, the first mounting structure 620 comprises a fastening structure 624. The fastening structure 624 facilitates the attachment of the first holder 600 to another structure for example, the torque tube 218. In the examples of FIGS. 6a and 6b, the fastening structure is a hole for receiving a bolt or a screw. In some examples, the hole is a through hole. In other examples, the hole is a threaded hole. The first holder 600 may be secured to the torque tube 218 by connecting the first holder 600 to the torque tube 218 with a bolt or screw via the fastening structure 624. The first mounting structure 620 also comprises a cable opening 630 into which the cable can be inserted to reach the first relay frame 604 via the rigid hollow arm 602. The cable opening leads from the first mounting structure 620 into the rigid hollow arm 602.

In the examples of FIGS. 6a and 6b, the first mounting structure 620 comprises a protrusion 626 extending in a direction away from the rigid hollow arm 602. The fastening structure 624 is provided on the protrusion 626. In other examples, the first mounting structure 620 may have a different configuration, so long as the fastening structure 624 facilitates attachment of the first holder 600 to the torque tube 218. The first mounting structure 620 also comprises a cable opening 630 for the cable to be inserted into the first holder 600 to reach the relay 502.

Figures 7A, 7B:
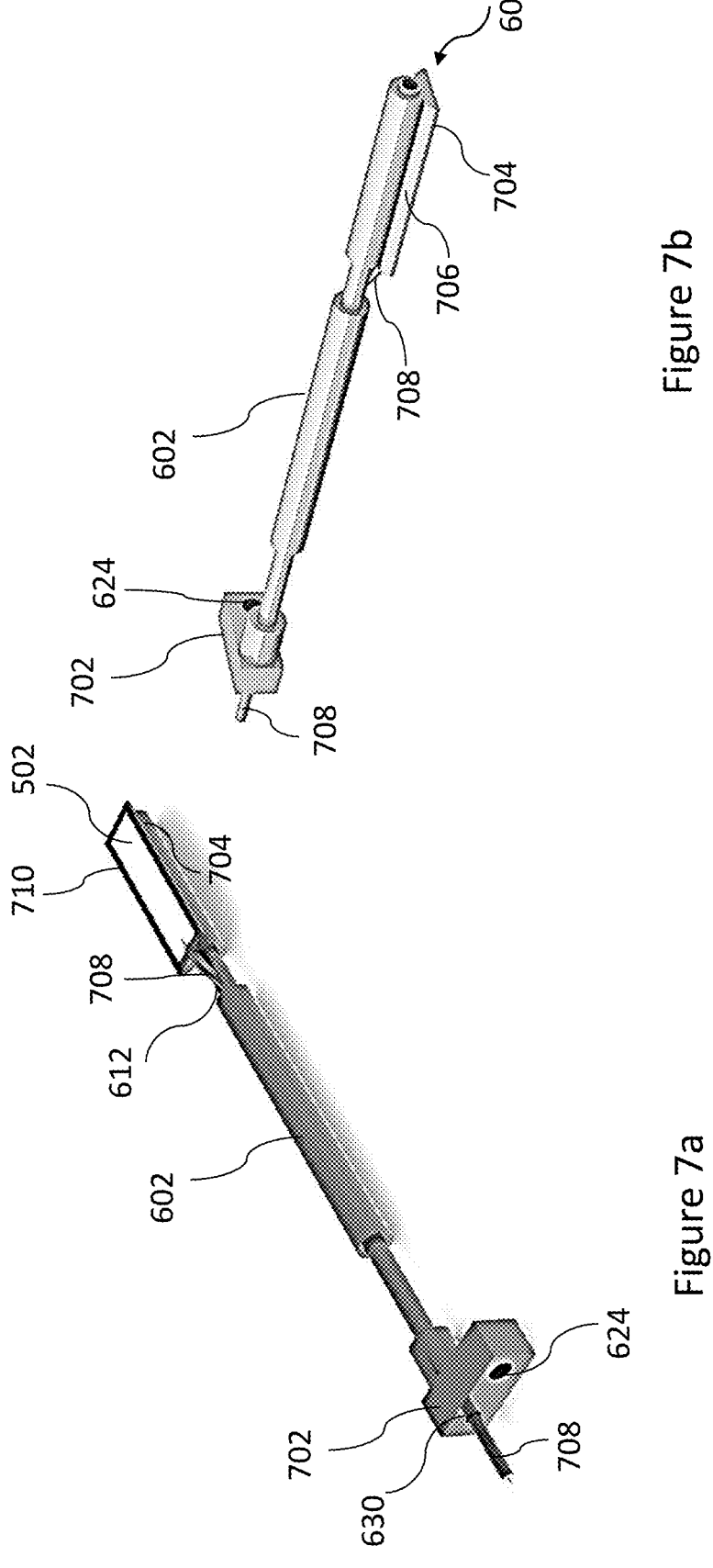
FIG. 7a is a first simplified schematic perspective view of a holder for a relay, according to a second example.
FIG. 7b is a second simplified schematic perspective view of the holder for the relay according to the second example.

FIG. 7a is a first simplified schematic perspective view of a second holder 700 according to an example. FIG. 7b is a second simplified schematic perspective view of the second holder 600 from a different angle to FIG. 7a. Similarly to the first holder 600, the second holder 700 is a particular example of the described holder for a relay.

The second holder 700 comprises the features of any of the examples of the first holder 600 except for the following differences. The holder 600 comprises a second mounting structure 702 different to the previously described first mounting structure 620. The second holder 700 comprises a second relay frame 704 different to the previously described first relay frame 604 in the context of the first holder 600. The second relay frame 704 of FIGS. 7a and 7b is different in that the longitudinal edges of the second relay frame 704 closest to the rigid hollow arm 602 are chamfered. The remaining features of the second holder 700 are the same as those described above for the first holder 600, and the same reference numerals as FIGS. 6a and 6b are used to indicate them in FIGS. 7a and 7b.

One of the chamfered edges 706 is shown in FIG. 7b. It will be appreciated that creating the chamfer removes material from the second relay frame 704. As such, the second holder 700 may advantageously be more easily inserted, starting at the first end 606, through certain openings. For example, the second holder 700 may more easily be inserted through openings where the longitudinal edges closest to the rigid hollow arm 602 of the first relay frame 604 of FIGS. 6a and 6b would otherwise inhibit insertion through said openings. In other words, the longitudinal edges closest to the rigid hollow arm 602 do not obstruct insertion into certain openings when they are chamfered away. The chamfered edges therefore advantageously provide for more easy insertion, starting at the first end 606, into openings where insertion is more difficult or not possible when the longitudinal edges closest to the rigid hollow arm 602 are present.

In the examples of FIGS. 7a and 7b, the second mounting structure 702 is a rectangular cuboid. The second mounting structure 702 does not have a protrusion as described in the case of the first mounting structure 620. In the case of the first mounting structure 620 of FIGS. 6a and 6b, the protrusion 626 may be formed by cutting material away from a rectangular cuboid. On the other hand, the second mounting structure 702 is one uniform shape. In some examples, the second mounting structure 702 being a rectangular cuboid may provide more robust attachment via the fastening structure 624. This may be because when the fastening structure 624 is a hole through the second mounting structure 702, more of a fastener inserted therein is positioned within the second mounting structure 702 helping to hold the second mounting structure 702 to for example, the torque tube 218.

In some examples, for example in use, the holder according to any of the described examples comprises the cable accommodated in the rigid hollow arm 602 and the relay 502 accommodated in the first relay frame 604 or the second relay frame 704, as the case may be. In the examples of FIGS. 7a and 7b, there is a cable 708 accommodated in the rigid hollow arm 602. The cable 708 is for carrying a signal to and from the relay 502. The cable 708 exits from the cut out 612 to connect to the relay 502 held in the second relay frame 704. The cable 708 may comprise a cover which provides protection to the internal components of the cable 708 from high temperatures. For example, the cover for the cable 708 may comprise a material that can withstand temperatures of up to 1000° C.

Referring again to the examples of FIGS. 6a and 6b, the first frame border 616 of the first holder 600 is attached to the first relay frame 604 by four screws or bolts 628 (some of which are labelled in FIGS. 6a and 6b). For example, the first frame border 616 comprises through holes for the screws/bolts and the first relay frame 604 comprises appropriately positioned threaded holes to receive the threaded portions of the screws/bolts. The second frame border 710 of the second holder 700 is attached to the second relay frame 704 by means other than screws or bolts. For example, the relay 502 and the cable 708 may be installed, and the second frame border 710 may be adhered or otherwise attached to the second relay frame 704. In some examples, the second frame border 710 may be attached to the second relay frame 704 by spot welding. The manner of attaching the second frame border 710 to the second relay frame 704 (for example, without the use of screws/bolts) may be particularly suitable for the harsh environment of the brake 200. For example, the manner of attachment may be robust enough to outlast high temperatures, physical shocks and vibrations of the kind likely in an aircraft wheel brake such as the described brake 200. In some examples, the manner of attaching the second frame border 710 to the second relay frame 704 without using screws/bolts may be advantageous because it may avoid having to create and tap through holes and threaded holes in second frame border 710 and the second relay frame 704 which may be thin pieces of metal.

Figure 7C:
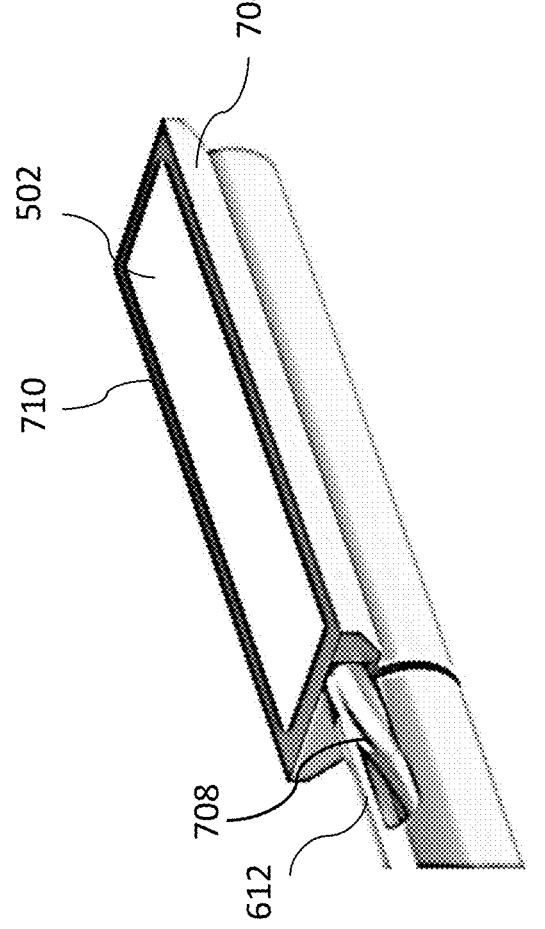
FIG. 7c is a third simplified schematic perspective view of a part of the holder for the relay according to the second example.

FIG. 7c is a schematic perspective close-up view showing the second relay frame 704, according to an example. The relay 502 is accommodated in the second relay frame 704 and held in place by the second frame border 710. As described, the cable 708 carries signals to and from the relay 502. The cable 708 electrically couples (for example, by forming an electrically conductive connection) to the relay 502. For example, the cable 708 carries one or more electrical wires which connect to electronic components of the relay 502. The electrical wires provide the interrogation signal to the relay 502 and take the output signal received by the relay 502 to other parts of the temperature sensing system, for example. In some examples, the electrical connection between the cable 708 and the relay 502 is formed using Platinum (Pt) bond wires.

In some examples, the cable 708 is coupled to the relay 502 via a brazed connection. Those skilled in the art will appreciate that brazing provides for creating strong and robust connections between the same or different metals. Forming a brazed connection between the one or more wires of the cable 708 and the electronic components of the relay 502 may advantageously provide robust connection that can withstand the harsh environment of the brake 200, for example. It will be appreciated that the first holder 600 and the second holder 700 is constructed to house the relay 502 in a harsh environment, and forming a brazed connection adds to the ability of the described construction to cope with the harsh environment (for example, where physical shock and vibration takes place during braking).

In some examples, there may be one or more redundant electrical connections formed between one or more wires carried by the cable 708 and the relay 502. For example, a wire carried by the cable 708 for carrying the interrogation signal may form more than one electrical connection with the relay 502 so as to have a redundant connection. Those skilled in the art will appreciate the various ways of providing redundancies in the context of electrical connections to electronic components such as the described relay 502. In some examples, the cable 708 carries one or more redundant wires for respective one or more redundant connections. For example, one or more redundant wires may be provided which can bring the interrogation signal to the relay 502. If the main wire for the interrogation signal fails or gets damaged, then the interrogation signal may instead be delivered by one of the redundant wires for the interrogation signal. In some examples, there may be redundant wires to carry the output signal away from the relay 502. One or more redundant wires may be provided for one or more of the functions of the relay 502. Providing such redundancies improves the reliability of the system comprising the first holder 600 and the second holder 700, and the relay 502.

The holder according to any of the described examples may be constructed from a robust material which can withstand high temperature likely to occur within the brake 200 (for example, up to 1000° C.), and which can withstand the physical shocks and vibrations of braking applications. For example, the holder according to any of the described examples may be constructed from stainless steel. In some examples, the described holder is constructed from stainless steel 304.

Figure 8:
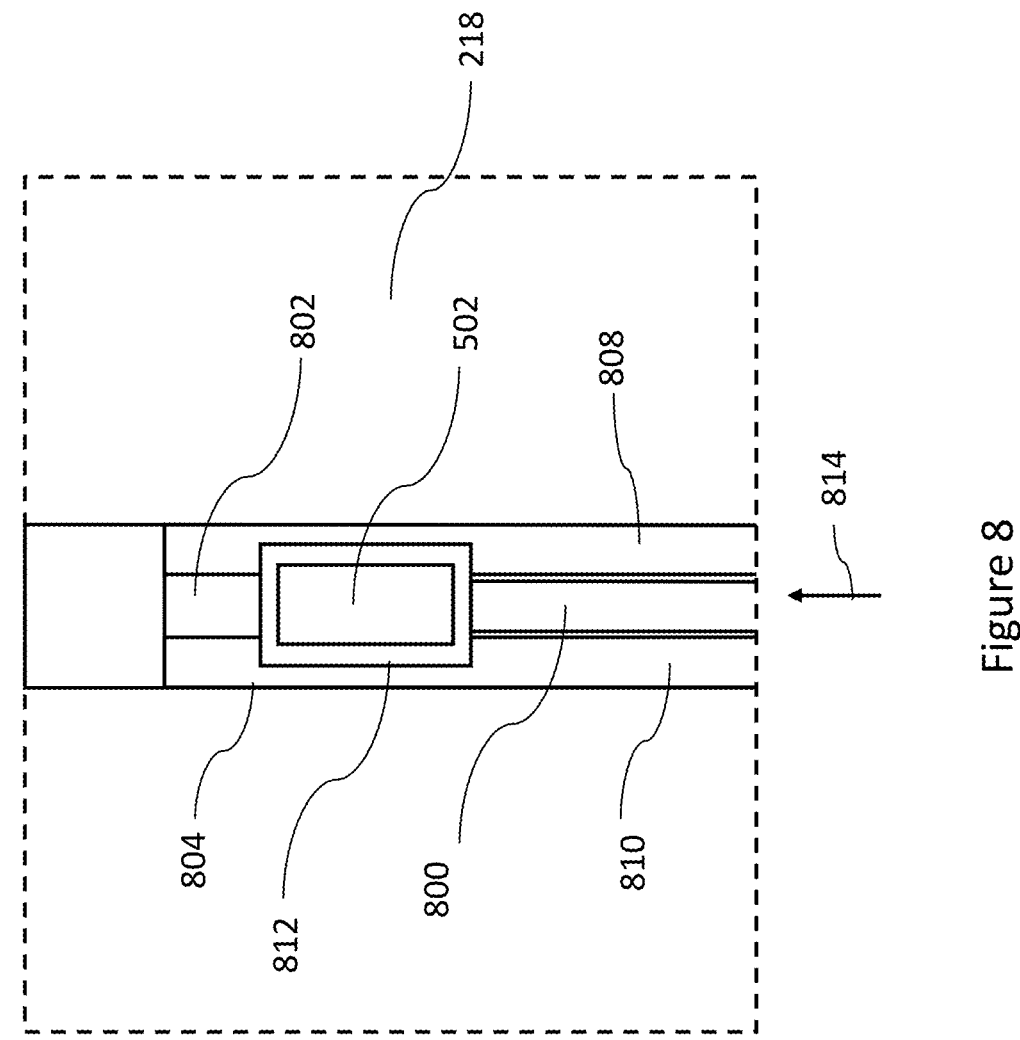
FIG. 8 is a simplified schematic plan view of a part of a torque tube, according to an example.

FIG. 8 is a simplified schematic diagram of a third holder 800 for the relay 502 received in a groove 802 in a torque tube spline 804 of the torque tube 218. The third holder 800 represents the holder according to any of the described examples. For example, the third holder 800 may correspond to the first holder 600 described with reference to FIGS. 6a and 6b. For example, the third holder 800 may correspond to the second holder 700 described with reference to FIGS. 7a and 7b. The third holder 800 is a generic version of the described holder referred to herein for the purpose of illustrating how the described holder may be installed onto the torque tube 218. For example, the third holder 800 comprises a first support member 812, which represents the support member according to any of the described examples. For example, the first support member 812 may correspond to the first relay frame 604 or the second relay frame 704.

The torque tube spline 804 is a spline which extends from the torque tube 218 and engages with (is received in) a complementary structure (for example, an appropriately dimensioned notch) in those brake discs which are keyed to the torque tube 218. The dashed lines in FIG. 8 indicate that only a part of the torque tube 218 is shown in a simplified manner and other components are not shown.

In the example of FIG. 8, the groove 802 is provided between a first surface 808 and a second surface 810, which face away from the torque tube 218. In this example, the part of the first support member 812 housing the relay 502 rests on top of the first and second surfaces 808, 810. The third holder 800 may be installed in the groove 802 so that it is positioned at an appropriate location along the groove 802 for wirelessly communicating with the temperature sensing device 300, for example. For example, the third holder 800 may be positioned to line up with the temperature sensing device 300 attached to the first stator 210a.

Figure 9:
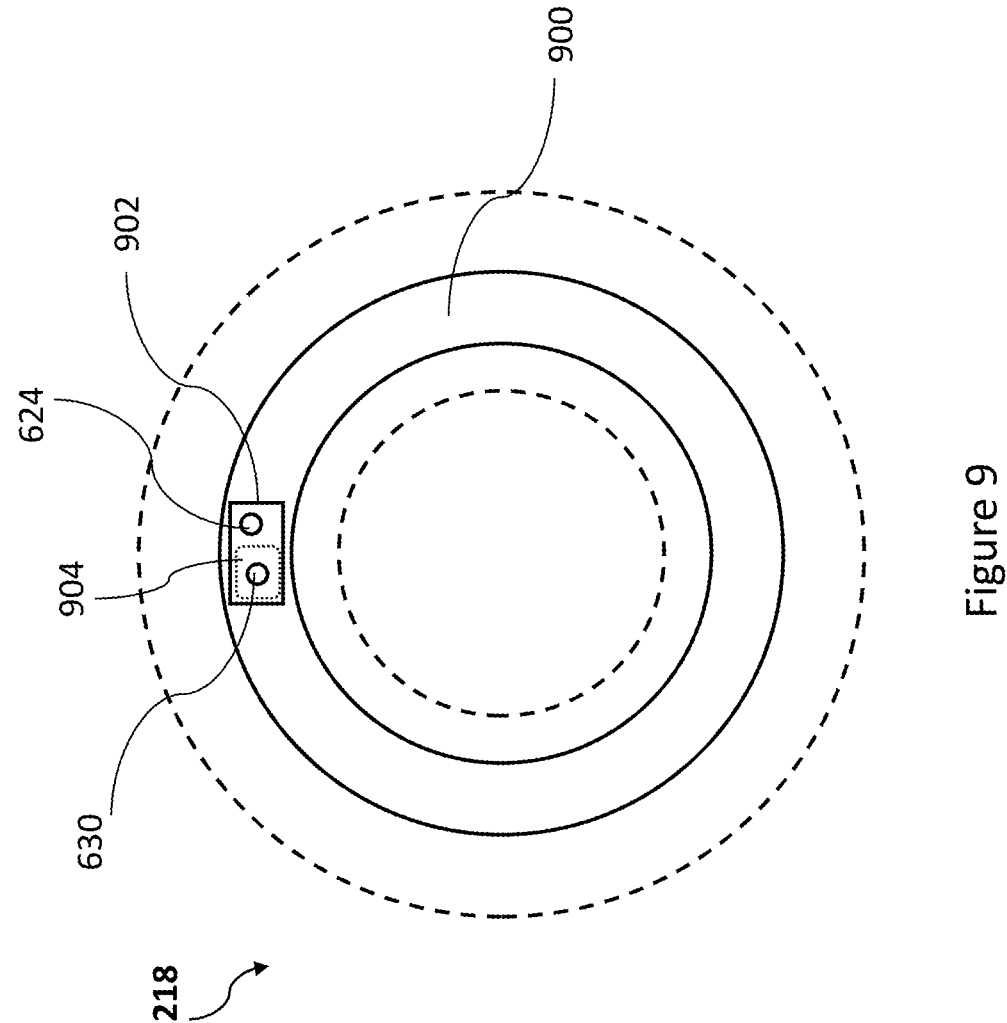
FIG. 9 is a simplified schematic side view of a part of the torque tube of FIG. 8.

FIG. 9 is a simplified schematic view of the torque tube 218 from an angle as indicated by arrow 814 in FIG. 8. The plane of FIG. 9 is perpendicular to the plane of FIG. 9. FIG. 9 shows a torque tube part 900, and the dashed lines indicate that there are components of the torque tube 218 which are not shown. A third mounting structure 902 is shown mounted to the torque tube part 900. The third mounting structure 902 is a component of the third holder 800 of FIG. 8. Accordingly, the third mounting structure 902 is a generic mounting structure representing the mounting structure according to any of the described examples.

In the example of FIG. 9, the torque tube part 900 comprises an opening 904, which is behind the third mounting structure 902 in the orientation shown in FIG. 9. As such, the opening 904 is shown in dotted line. The third holder 800, starting at the first support member 812 end, may be inserted into the opening 904 during installation. The third mounting structure 902 comprises the cable opening 630 which leads into the rigid hollow arm of the third holder 800. For example, the cable carrying signals to and from the relay 502 may be inserted into the cable opening 630. The third mounting structure 902 comprises the described fastening structure 624. In this example, the fastening structure 624 is a hole 624. The hole 624 may be a threaded hole or a through hole. For example, the third holder 800 is mounted to the torque tube 218 by attaching the mounting structure 902 to the torque tube part 900 via the hole 624. For example, there is a through hole or threaded hole (as appropriate) not shown in FIG. 9 aligned with the hole 624 of the third mounting structure 902 and behind the third mounting structure 902. A screw/bolt is used to attached the third mounting structure 902 to the torque tube part 900 via the hole 624 in the third mounting structure 902.

Figure 10:
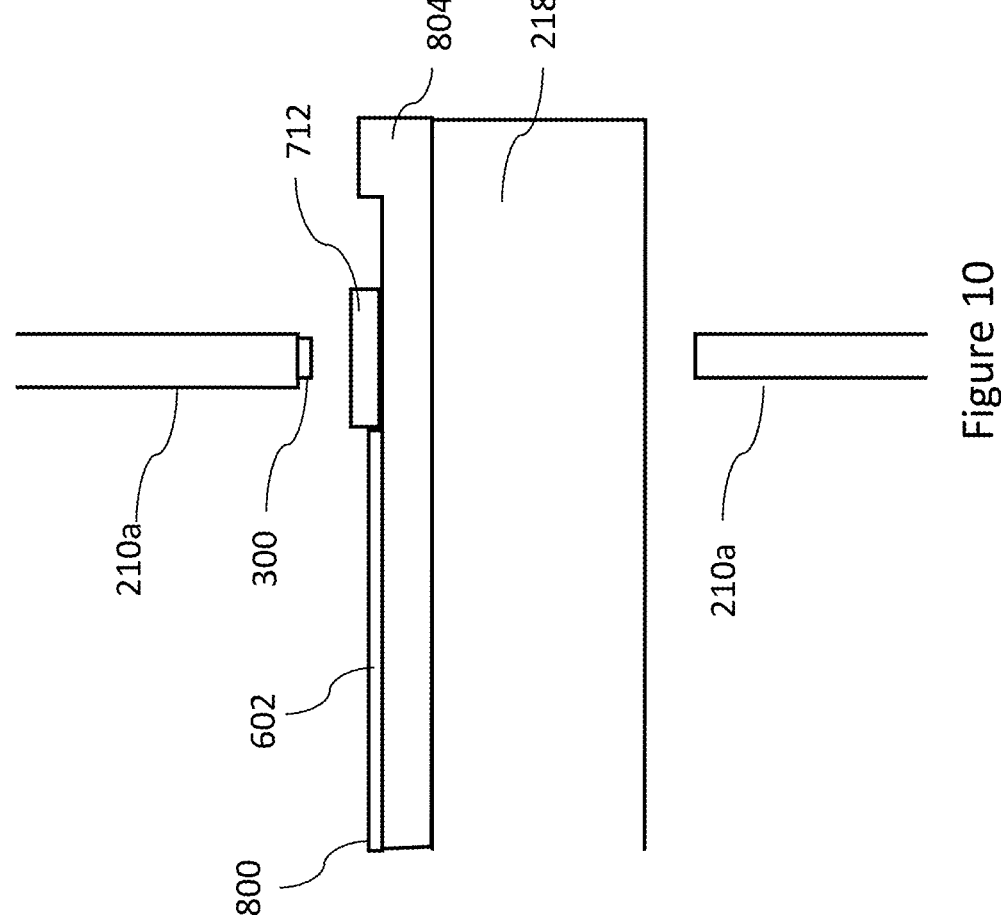
FIG. 10 is a simplified schematic cross sectional view of a part of the torque tube of FIG. 8 and a part of a brake disc, according to an example.

FIG. 10 is a simplified schematic side cross-sectional view of the torque tube 218 with the third holder 800 mounted thereon. FIG. 10 is simplified and other component of the torque tube, etc., are not shown for simplicity. The first stator 210a is shown in relation to the torque tube 218. As described, the temperature sensing device 300 may be attached to the first stator 210a. In this example, the temperature sensing device 300 is attached to the first stator 210a in a notch configured to key the first stator 210a to the torque tube spline 804. It will be appreciated that other brake discs will be present adjacent to the first stator 210a. For simplicity, other brake discs are not shown.

In the example of FIG. 10, the third holder 800 is mounted such that the first support member 812, and therefore the relay 502 mounted therein, is in the line of sight of the temperature sensing device 300. Accordingly, the relay 502 and the temperature sensing device 300 can wirelessly communicate easily.

The rigid hollow arm 602 of the third holder 800 is a rigid hollow arm according to any of the described examples. In some examples, the rigid hollow arm 602 is extendable, as previously described. Referring to FIG. 2, when braking is applied, the pressure plate 204 is urged towards the reaction plate 206 so that the brake discs 202 come into contact with one another as shown in box 212 of FIG. 2. Over time, with more and more braking applications, the total length L of the brake discs 202 reduces. The reduction is due to wear. For example, the brake discs 202 get thinner due to material loss due to friction between the surfaces of the brake discs 202 that contact one another. As a result of wear, the position of the first stator 210a may change over time. If the rigid hollow arm 602 is extendable, this may advantageously provide for the position of the first support member 812 to be adjusted such that the relay 502 can be kept in the line of sight of the temperature sensing device 300.

Certain components are described as being electrically coupled to other components. In some examples, components may be electrically coupled by virtue of an electrical connection. Those skilled in the art will appreciate that electronic components may also be capacitively or inductively coupled, for example. The type of electrical coupling depends on the characteristics of the electronic components and the particular application.

It should be noted that the Figures show simplified schematic views for the purpose of illustration. The Figures are intended to illustrate the described concepts and are not intended to convey dimensions, relative sizes of components and the like. In some cases, certain components are not shown for simplicity, as will be appreciated by those skilled in the art.

Although the invention has been described above with reference to one or more preferred examples, it will be appreciated that various changes or modifications may be made without departing from the scope of the invention as defined in the appended claims.

The invention claimed is:

1. A holder for a wireless relay device, the holder comprising:
    a rigid hollow arm member to be received in a groove in a torque tube spline of an aircraft wheel brake; wherein the rigid hollow arm member is extendable; and
    a support member to support the wireless relay device, the support member mechanically coupled to the rigid hollow arm member towards a first end of the rigid hollow arm member,
wherein:
    the rigid hollow arm member provides a conduit for a communications cable to couple to the wireless relay device.

2. The holder according to claim 1, wherein the rigid hollow arm member comprises an orifice towards the first end to permit the communications cable to the exit the rigid hollow arm member to couple to the wireless relay device.

3. The holder according to claim 1, wherein the rigid hollow arm member has a circular cross-section.

4. The holder according to claim 1, wherein the support member is a relay frame to accommodate the wireless relay device.

5. The holder according to claim 4, further comprising a frame border to hold the wireless relay device in position within the relay frame.

6. The holder according to claim 4, wherein longitudinal edges of the relay frame closest to the rigid hollow arm member are chamfered.

7. The holder according to claim 1, further comprising the communications cable accommodated in the rigid hollow arm member; and
    the wireless relay device accommodated in the support member.

8. The holder according to claim 7, wherein the communications cable carries one or more wires/cables for respective one or more redundant connections to the wireless relay device.

9. The holder according to claim 7, wherein the communications cable is coupled to the wireless relay device via a brazed connection.

10. The holder according to claim 1, further comprising a mounting structure towards a second end of the rigid hollow arm member, opposite to the first end, the mounting structure permitting attachment to a torque tube of the aircraft wheel brake.

11. An aircraft wheel brake comprising the holder according to claim 1 installed on a torque tube of said aircraft wheel brake.

12. An aircraft comprising the aircraft wheel brake according to claim 11.

* * * * *